Aug. 18, 1931.  H. GORNICK  1,819,089
DEVICE FOR MEASURING SLIGHT FORCES
Filed April 18, 1924
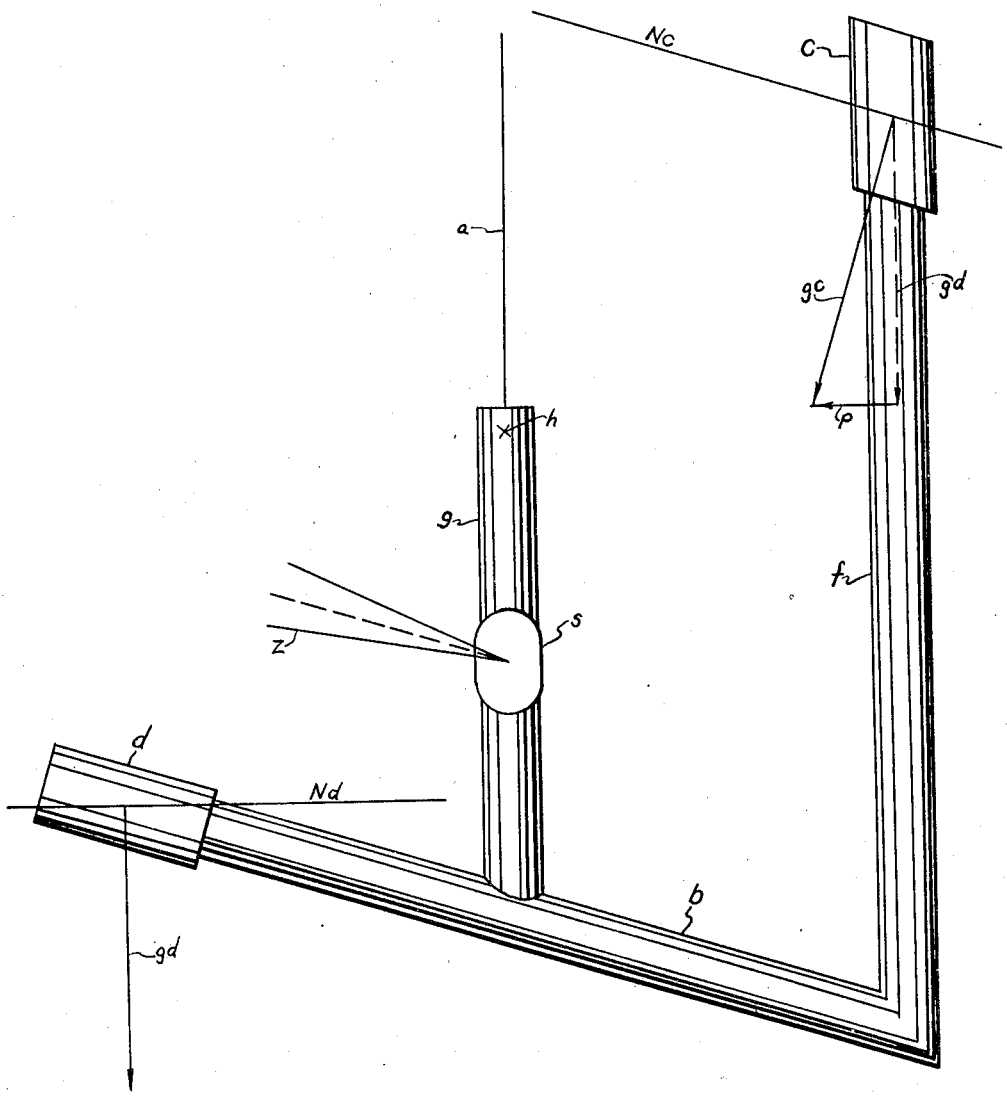
INVENTOR
Hugo Gornick
BY 
ATTORNEY Patented Aug. 18, 1931

1,819,089

UNITED STATES PATENT OFFICE

HUGO GORNICK, OF CHARLOTTENBURG, GERMANY

DEVICE FOR MEASURING SLIGHT FORCES

Application filed April 18, 1924, Serial No. 707,449, and in Germany August 10, 1923.

This invention relates to a device for measuring slight forces by ascertaining the torsion produced in a thread.

The devices that have previously been used for this purpose were of such large dimensions that they were unwieldly and inconvenient for practical purposes and quite useless for field work. In marshy and heavily wooded districts the transportation of the instruments known to the prior art is beset with difficulties that are practically unsurmountable. Furthermore, it is quite impossible to use such an instrument of large dimensions in confined pits, galleries and levels of mines.

In the new device forming the object of this invention these drawbacks are eliminated by using a rigid connection between the two weights lying in different planes of level.

In the drawing accompanying the application and forming part thereof, a form of construction embodying my invention is illustrated.

In this construction a balance beam $b$ is suspended from a torsion thread $a$, and equal weights $c$ and $d$ are placed on each end of the beam $b$. On one side the weight $d$ is supported directly on the end of the beam while on the other side the weight $c$ is positioned above the balance beam $b$ and is rigidly connected to the latter by means of a thin rod $f$. In order to insure that the suspension system will always be in equilibrium, the point, where the torsion thread or wire $a$ is connected, is above the center of gravity $h$ of the suspension system. Accordingly, an upright $g$ is rigidly connected to the center of the balance beam $b$, and this upright extends up to a point directly above the center of gravity $h$ of the entire system. The torsion thread $a$ is attached to the upper end of this upright $g$.

The horizontal and vertical distance of the weights $c$ and $d$ from each other, may be altered to suit different conditions.

In order to make matters more clear, I imagine before me the problem to ascertain the behaviour of gravity in space at a distinct point of land. The device having been suspended in the manner shown in the drawing the beam $b$ will assume a horizontal position, and the weight $c$ is now located in another level of gravity than the weight $d$. It may be assumed in the case to be dealt with that the beam $b$ extends from the east to the west, the weight $d$ is located in the east, and the gravity alters solely from the north to the south which would be the case if the general shape of the earth were that of an ellipsoid of rotation.

If vertical planes of intersection are so placed as to extend in the north-south direction, they will intersect the levels of gravity. Two such traces of intersection passing through the weights $c$ and $d$ are indicated in the drawing and denoted by $Nc$ and $Nd$; they show the course and the curvature of the two levels concerned. Said traces do not extend parallel to each other, but approach one another in northerly direction.

As the direction of the gravitational force is perpendicular to the level surface, it attacks the weight $c$ with the force $gc$ in a direction other than that in which the weight $d$ is attacked by the force $gd$ there arising thus between these forces a horizontal component $p$, the magnitude of which is proportional to the small angle formed between the forces $gc$ and $gd$. This angle is equal to the angle formed by the levels in question and indicates, the amount that the distance between said levels decreases in northerly direction per unit of length, that is to say, the amount that the gravity increases, in said direction also per unit of length, because the distances between two neighboring levels of gravity, measured in the direction of the normal, are in a relation to each other which is in inverse proportion to the forces of gravity.

The force $p$ tends to turn the beam $b$ but this motion is opposed by the torsional force of the suspension thread. When both forces are in equilibrium the position of the beam is ascertained by means of a ray of light $z$ and by a mirror $s$. As the torsional constant of the suspension thread, the inertia of the system of rods, and the other magnitudes can be ascertained, the magnitude of the increase of the gravity can also be ascertained easily by measurements in several azimuths.

As to the magnitude of the force to be measured in this special case, the following consideration will afford information; the gravity increases from the equator to the poles. Correspondingly there is obtained, for instance, for the 50th latitude in northerly direction the gradient of 8 x 10—9 units of the c-g-s-system. Such slight forces can be indicated by torsion balances as is known from the many publications relating to these balances. It is, of course, essential that the weight $c$ be located on another level than the weight $d$.

I claim:

1. A device for measuring slight forces by ascertaining the torsion imparted to a thread, comprising in combination a torsion thread, and a rigid scale system suspended by said torsion thread, and consisting of a balance beam and two weights which are in different horizontal planes, one of said weights being placed above the level of the balance beam.

2. A device for measuring slight forces by ascertaining the torsion imparted to a thread, comprising in combination a torsion thread, and a rigid scale system suspended by said torsion thread, and consisting of a balance beam and two weights, one of said weights being placed above the level of the balance beam and being rigidly secured to said balance beam by a thin rod, whereas the second weight is placed directly upon the balance beam, substantially as described.

3. A device for measuring slight forces by ascertaining the torsion imparted to a thread, comprising in combination a torsion thread, and a rigid scale system suspended by said torson thread, and consisting of a balance beam, two weights, one of said weights being placed above the level of the balance beam and being rigidly secured to said balance beam by a thin rod, whereas the second weight is placed directly upon the balance beam, and an upright member set up in the center of said balance beam, said upright member being fixed to the torsion thread at a point slightly above the center of gravity of the entire suspension system, substantially as described.

4. A device for measuring slight forces by ascertaining the torsion imparted to a thread, comprising in combination a torsion thread, and a rigid scale system suspended by said torsion thread and consisting of a balance beam and two weights, which are placed at equal horizontal distances from the center of said balance beam and in planes having a constant difference of level, one of said weights being placed above the level of the balance beam and being rigidly secured to said balance beam by a thin rod, whereas the second weight is placed directly upon the balance beam, substantially as described.

5. A device for measuring slight forces by ascertaining the torsion imported to a thread, comprising in combination a torsion thread, a rigid scale system suspended by said torsion thread and consisting of a balance beam and two weights, one of said weights being placed above the level of the balance beam and being rigidly secured to said balance beam by a thin rod, whereas the second weight is placed directly upon the balance beam, both weights being adjustable as to their relative position in horizontal and vertical direction, substantially as described.

New York, April 17th, 1924.

HUGO GORNICK.